Nov. 28, 1950     B. M. HYMAN     2,532,065
COTTON STRIPPER MACHINE Filed Jan. 28, 1948     6 Sheets-Sheet 1

INVENTOR.
Benjamin M. Hyman

Nov. 28, 1950          B. M. HYMAN          2,532,065
COTTON STRIPPER MACHINE Filed Jan. 28, 1948          6 Sheets-Sheet 3

INVENTOR.
Benjamin M. Hyman
Paul O. Pippel
Atty.

Nov. 28, 1950     B. M. HYMAN     2,532,065
COTTON STRIPPER MACHINE Filed Jan. 28, 1948     6 Sheets-Sheet 4

INVENTOR.
Benjamin M. Hyman
Paul O. Pipple
Atty.

Nov. 28, 1950  B. M. HYMAN  2,532,065
COTTON STRIPPER MACHINE
Filed Jan. 28, 1948  6 Sheets-Sheet 5

INVENTOR.
Benjamin M. Hyman
Paul O. Pippel
Atty.

Nov. 28, 1950 B. M. HYMAN 2,532,065
COTTON STRIPPER MACHINE
Filed Jan. 28, 1948 6 Sheets-Sheet 6

INVENTOR.
Benjamin M. Hyman

Patented Nov. 28, 1950

2,532,065

UNITED STATES PATENT OFFICE 2,532,065

COTTON STRIPPL. MACHINE

Benjamin M. Hyman, Moline, Ill., assignor to International Harvester Company, a corporation of New Jersey Application January 28, 1948, Serial No. 4,759

5 Claims. (Cl. 56—14)

This invention relates to machines for stripping cotton bolls from rows of plants in the field, and concerns more particularly a stripper unit containing companion stripper rollers which are endwise advanceable along opposite sides of a plant row for stripping the plants of their bolls, and a new conveyor system for delivering the stripped bolls to an elevator.

A cotton stripper unit constructed according to the principles of this invention comprises a frame-like housing divided at a forward end thereof to form a plant receiving throat and companion stripper rollers extending in parallelism upwardly and rearwardly from the front or entrance end of the throat and disposed upon opposite sides of a median line thereof. An object of this invention is the provision of an auger trough in one part of the divided stripper unit casing for receiving stripped bolls discharged laterally from the stripping rollers.

A further object is the provision of journaled mountings for the stripper rollers, so arranged that the roller most remote from the auger trough is at higher elevation than the roller adjacent to the trough to expedite discharge of the stripped bolls toward the trough.

Another object is the provision of a cotton stripper unit having an auger trough communicative at a rear portion thereof with an elevator hopper and containing an auger provided with a paddle portion registering with the communication between the trough and hopper for discharging the stripped cotton into the hopper when such cotton is moved rearwardly in the trough sufficiently far to be engaged by the paddle.

Still a further object is the provision of a tractor-mountable cotton stripper unit embodying a housing of which the forward portion is divided into laterally spaced parts which form a plant receiving throat, rearwardly and upwardly inclined stripping rollers on respective sides of a median line extending longitudinally of the throat, a substantially horizontal auger trough in one of said housing parts and extending rearwardly along one side of and below the adjacent stripper roller, and the auger trough extending rearwardly of the housing for adapting it to direct stripped cotton bolls beneath an axle housing of a tractor whereon the housing is mounted forwardly of such axle housing alongside of the tractor engine.

An additional object is the provision of a tractor-mountable cotton stripper apparatus wherein there is a frame disposed rearwardly of rear axle housings of the tractor and having an elevator hopper disposed rearwardly of and below the axle housings, a stripper unit projecting forwardly from one side of the hopper for disposition below and forwardly of one of the axle housings and alongside of the tractor body, the unit having a pivotal connection with the frame to facilitate vertical adjustment of the front end of such unit, and the unit comprising a laterally divided housing to form a plant receiving throat, stripping rollers extending upwardly and rearwardly in the throat on opposite sides of a longitudinal median line thereof, an auger trough extending horizontally alongside of one of the stripping rollers and rearwardly into communicative registry with the elevator hopper, and an auger in the trough for progressing the stripped cotton bolls rearwardly of the trough and discharging the same into the elevator hopper.

Referring now to the drawings.

The cotton stripper apparatus herein illustrated employs two stripper units 21 and 22. These units are mounted upon opposite sides of a tricycle type tractor 23 having rear traction wheels 24 and 25 constrained for rotation with axles 26 and 27 which project outwardly from axle housings 28 and 29. The body 31 of the tractor projects forwardly from the usual differential housing 32 to which the axle housings 28 and 29 are secured, such body including an engine 33.

Figure 4:
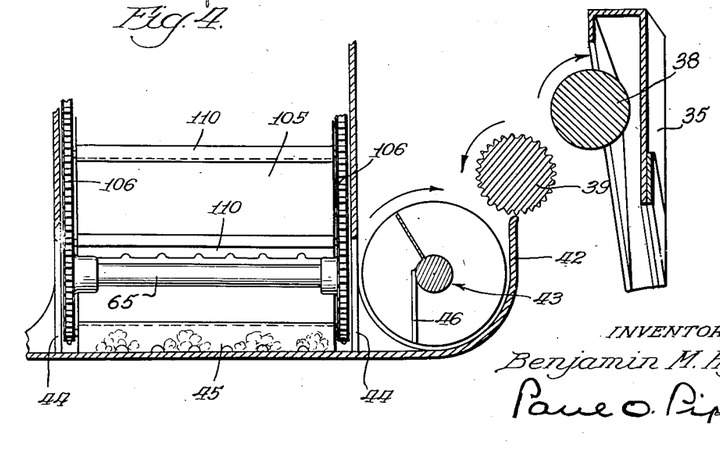
Fig. 4 is a vertical sectional view taken substantially on the irregular line 4—4 of Fig. 6.
Figure 5:
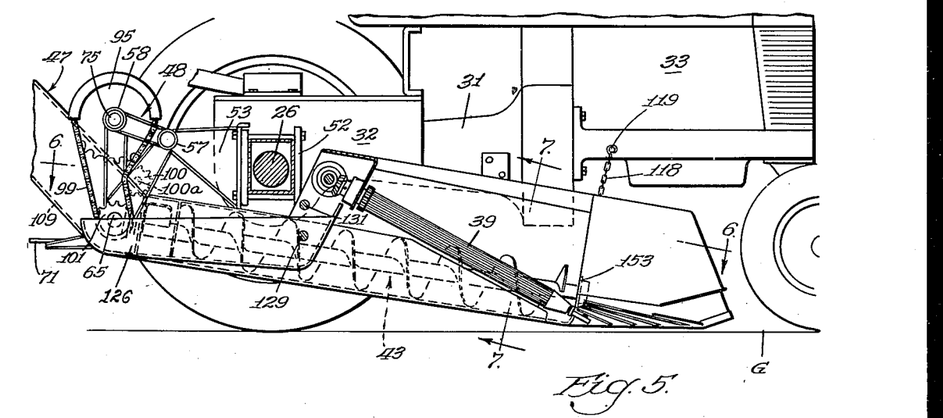
Fig. 5 is a vertical sectional view taken longitudinally of one of the stripper units substantially upon the irregular line 5—5 of Fig. 6.
Figure 7:
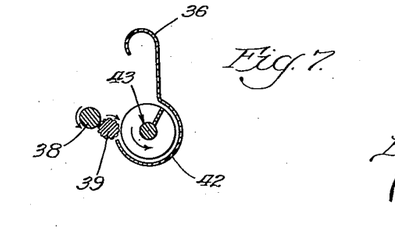
Fig. 7 is a vertical sectional view taken on the line 7—7 of Fig. 5, showing the relative position of the stripper rollers, the auger trough, and the auger in such trough.

Each stripper unit comprises a housing 34 with laterally spaced portions 35 and 36 providing a plant-receiving throat 37 open at the forward end of the unit. A pair of stripper rollers 38 and 39, on opposite sides of a longitudinal median line of the throat 37, are journaled in each of the stripper unit housings 34. These companion stripper rollers are inclined upwardly from a forward portion of the throat 37 to a rearward portion thereof as illustrated in Fig. 5. During operation of the apparatus, the tractor will be driven lengthwise of a pair of adjacent plant rows, the wheels 40 of the front steering truck 41 of the tractor then following a track half way between the rows while the traction wheels 24 and 25 straddle such pair of rows. This causes the stripper unit throats 37 to respectively register with the plant rows and the plant stems to be received between the companion stripper rollers 38 and 39. Meanwhile, the stripper rollers of each unit are being rotated in the direction indicated by the arrows in Figs. 4 and 7, and as the rollers advance lengthwise of the plant row, they also advance upwardly of the plant stalks. Because of the proximity of the rollers, the bolls of the mature crop are thus pinched from the stalks and discharged into an auger trough 42, which is adjacent to and slightly below the roller 39. The plant stalks from which the bolls are removed in this manner are allowed to remain in the soil and the upper portions of these plants withdrawn downwardly from between the rollers 38 and 39 as the machine proceeds along the plant row.

The augers 43 within the troughs 42 are rotated in the proper direction for advancing the removed cotton bolls rearwardly within the troughs 42 into registry with communications 44 between rearward portions of these troughs and a hopper 45. Each of the augers 43 has a radial paddle 46 for discharging the cotton bolls through the communications or openings 44 into the elevator hopper 45. The elevator 47 conveys the cotton bolls from the hopper 45 upwardly for discharge into the box of the wagon or the like (not shown) which may be towed behind the tractor.

Support for the elevator hopper 45, the elevator 47, and the stripper units 21 and 22 is provided by a frame structure 48 mounted upon and projecting rearwardly from the tractor axle housings 28 and 29. This frame structure 48 is shown by itself in Figs. 16 and 17. Each axle housing 28 and 29 has a mounting bar 49 fastened thereto by clamping bolts 51 and an oppositely disposed complemental clamping bar 52. Frame structure 48 comprises a pair of bracket like members 53, each having an upright footing section 54 for respective connection with the upright bars 49 by means of eye bolts 55 which are pivotally secured to the bars 49 by pins 56. Frame brackets 53 are welded to a transverse tube 57. A second transverse tube 58 is secured to the tube 57 by a pair of peripherally flanged plates 59 and at third plate 61, Fig. 16. Plates 59 and 61 are welded to the tubes 57 and 58. A pair of horizontal brace members 62 are welded at their ends to brackets 53 and plates 59. Depending portions 63 of the plates 59 support bearings 64 for a transverse shaft 65, Fig. 3. A pair of downwardly and rearwardly projecting plate-like arms 66 are welded to and supported by the transverse tube 57, and these arms 66 carry ball bearing units 67, Fig. 8, which are also for the shaft 65. Rearward extensions 68 at the lower ends of the arms 59 support a transverse drawbar 69 extending therebetween and welded thereto, this drawbar having an apertured coupling bracket 71 fastened thereto for the detachable connection of a trail-behind vehicle to the tractor.

Figure 2:
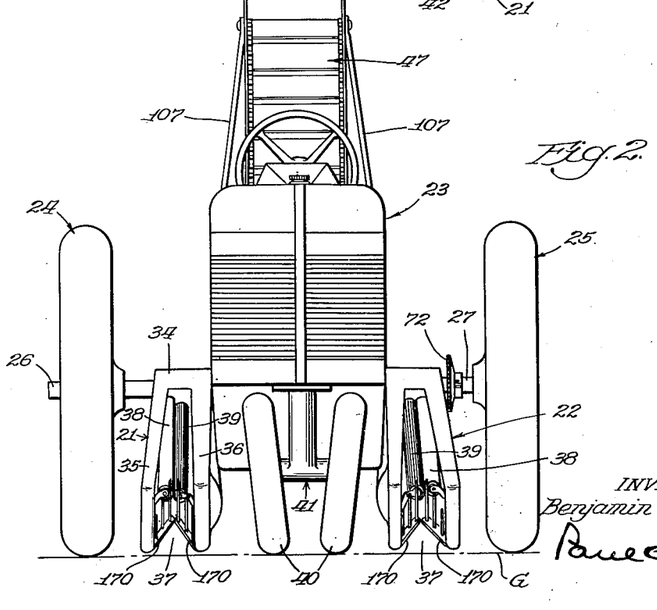
Fig. 2 is a front elevational view of the tractor and cotton stripping apparatus shown in Fig. 1, this view also showing a cotton stripper unit at the opposite side of the tractor and a portion of an elevator which projects upwardly and rearwardly from the tractor and from a hopper which receives cotton from the two stripper units.
Figures 3, 13:
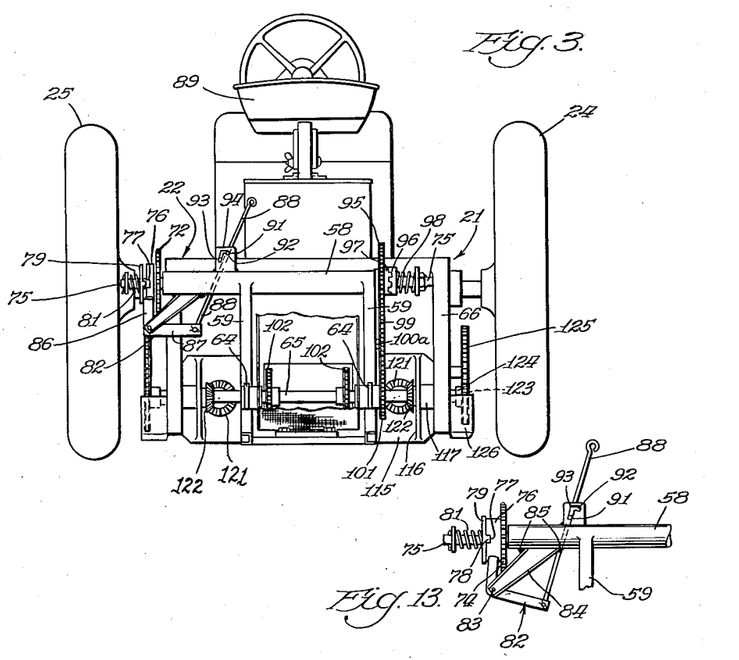
Fig. 3 is a rear elevational view of the tractor and of a supporting frame which is attached to the rear axle housings of the tractor to serve as mounting means for rear ends of the cotton stripper units projecting forwardly therefrom.
Fig. 13, on the sheet with Fig. 3, is a fragmentary rear elevational view of the frame at the rear of the tractor together with a main jaw clutch and shifting lever therefor for selectively establishing and disestablishing a driving connection for the stripper apparatus.
Figure 6:
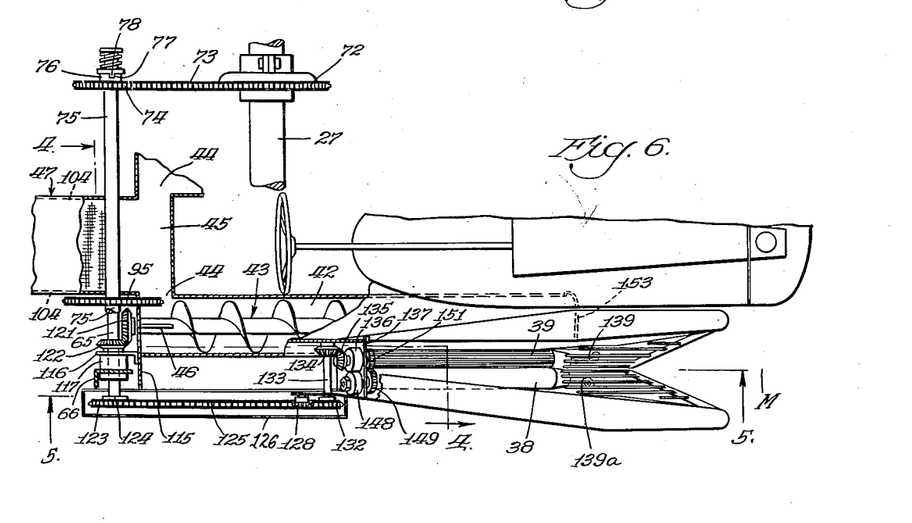
Fig. 6 is a fragmentary plan view, partly diagrammatic, and with portions of the tractor and the casing cover of the stripper unit broken away for exposing a rear portion of the auger and auger trough and power transmitting mechanism for driving the auger and the stripper rollers.

Driving force for both cotton stripping units 21 and 22 is obtained from a sprocket wheel 72 which is mounted upon and constrained for rotation with the driving axle 27 for the traction wheel 25; see Figs. 2, 3, and 6. A chain 73 is driven by the sprocket 72 for driving a sprocket 74 which is journaled upon a shaft 75, which extends through the frame structure tube 58, Figs. 16, 17, 5, and 6, wherein such shaft is supported upon bearings (not shown). Hub 76 of the sprocket 74 is notched at 77, Figs. 3, 6, and 13, for receiving teeth 78 on a clutch member 79 which is constrained for rotation with the shaft 75 and urged axially of this shaft by a spring 81 pressing the teeth 78 into associated notches 77 (one being shown) to establish a disconnectible driving connection between the sprocket 74 and the shaft 75.

Figure 16:
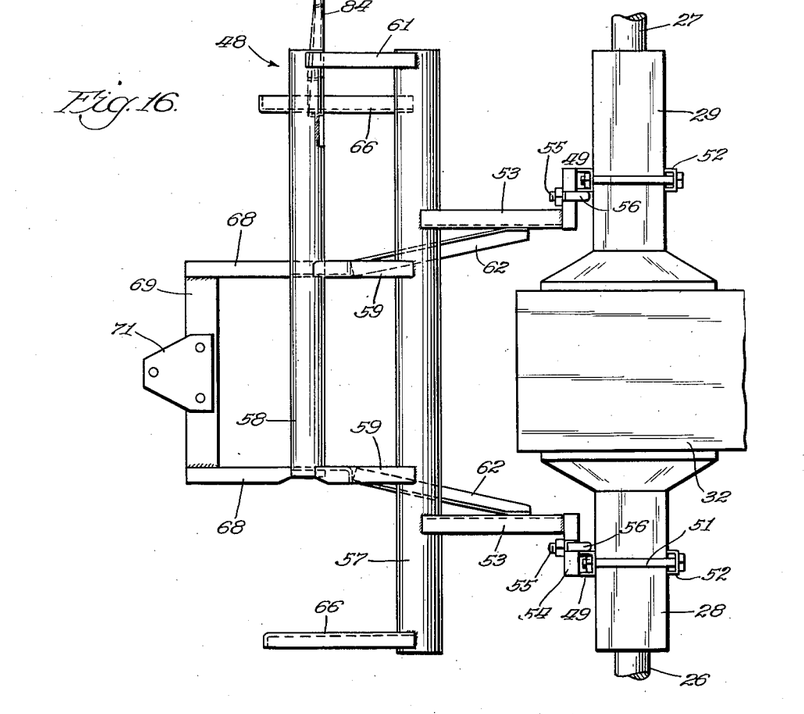
Fig. 16 is a plan view of the stripper unit supporting frame, illustrating the manner of attachment thereto to the rear axle housings of the tractor.
Figure 17:
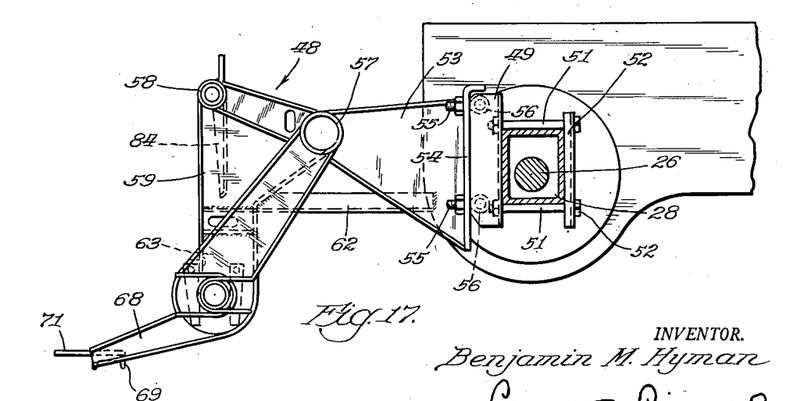
Fig. 17 is a side elevational view of the structure illustrated in Fig. 16.

Means for controlling engagement of the jaw clutch 77—78 comprises a bell-crank lever 82 pivoted at 83 upon an arm 84 welded to the transverse frame structure tube 58 at 85; see Figs. 3, 13, and 16. An upwardly projecting leg 86 of the bell-crank 82 is abuttable against jaw clutch element 79 for compressing the spring 81 and displacing this element to the position illustrated in Fig. 3 for holding the clutch 77—78 disengaged. This condition prevails when a horizontal leg 87 of the bell-crank is lifted upwardly by control rod 88, of which the upper end is accessible to an operator occupying the tractor seat 89. After lifting the control rod 88, a projection 91 thereon is inserted into a transverse portion 92 of a slot 93 within a bracket 94 which is welded to the transverse tube 58. When the control rod 88 is manipulated for bringing the stud 91 into registry with the vertical portion of the slot 93 and released, the spring 81 will be effective for meshing the engageable clutch 77—78 incident to pivoting the bell-crank 82 and causing the associated parts to occupy the positions illustrated in Fig. 13.

A right end portion of the shaft 75, as viewed in Fig. 3, carries a sprocket 95 which is normally constrained for rotation therewith by means of a rosette slip clutch comprising a scalloped element 96 constrained for rotation with the shaft 75 and urged by a spring 95 into mesh with a complementally scalloped end of the sprocket hub 97.

Figure 1:
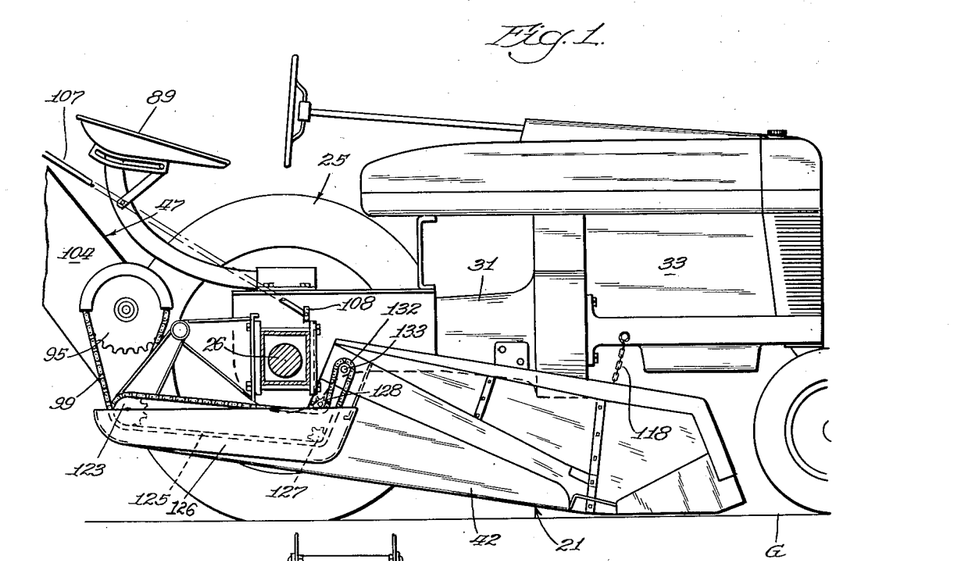
Fig. 1 is a side elevational view of a tractor having the nearest traction wheel removed for exposing, in side elevation, a cotton stripper unit constructed according to the principles of this invention and mounted on the tractor.
Figure 8:
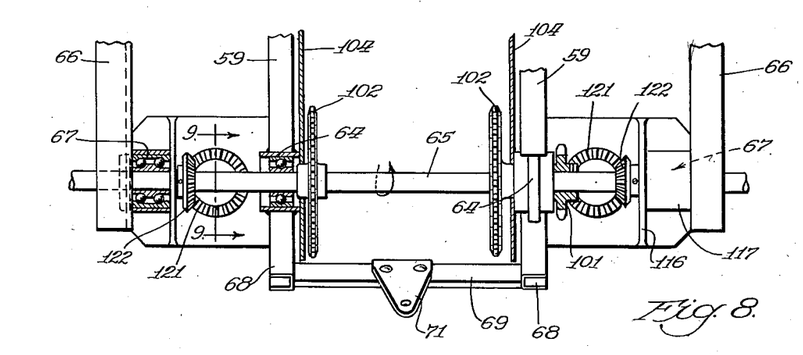
Fig. 8 is a fragmentary rear elevational view of the hopper and stripper unit supporting frame, a portion of the elevator being removed and a portion of the side walls thereof being shown in cross section for exposing drive sprockets for the elevator belt.
Figure 9:
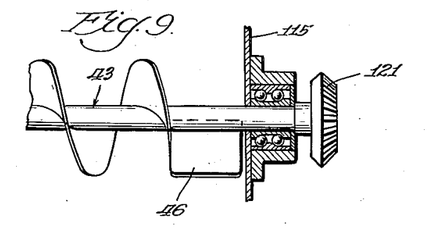
Fig. 9 is a fragmentary view showing the rear end of an auger shaft together with a bevelled drive gear therefor and a bearing unit in which the shaft is rotatably supported.

A chain 99 is trained over the sprocket 95 and a sprocket 101 therebelow on the transverse shaft 65, Fig. 3, 5, and 8. In this manner the shaft 65 is driven in the direction indicated by the arrow in Fig. 8 when the tractor is driven forwardly. An idler sprocket 100 mounted on a stub shaft 100ª, Figs. 3 and 5, is for maintaining desired tautness in the chain 99. A pair of elevator belt driving sprockets 102, Figs. 3, 4, and 8, are constrained for rotation with the shafts 65. The rearwardly and upwardly extending elevator 47, having side plates 104, is pivotable about the shaft 65 and encloses the sprockets 102 and an undershot cleated conveyor 105, which has chains 106 at its opposite edges trained over the sprockets 102 and complemental sprockets (not shown) at the upper end of the elevator. Brace rods 107, Figs. 1 and 2, are connected between an upper end portion of the elevator and anchorages 108 on respective sides of the tractor to prevent downward swinging of the elevator about the axis of the transverse shaft 65. Rotation of the shaft 65 in the direction indicated by the arrow in Fig. 8 will cause the sprockets 102 to rotate the cleated elevator belt 105 in the direction to carry its upper flight downwardly lengthwise of the elevator 47 and to carry its lower flight upwardly in opposed relation with the underside 109 of the elevator casing. The paddles or cleats 110, Fig. 4, upon the elevator belt 105 withdraw cotton bolls from the hopper 45, Fig. 6, and while trapping these bolls between the lower belt flight and the bottom 109 of the elevator convey these bolls upwardly for discharge into the box of a wagon or the like coupled onto the tractor in trail-behind fashion.

Referring now to the right-hand stripper unit as viewed from the rear in Fig. 3, the auger trough of this unit has a rear end plate 115, Figs. 3 and 6, carrying a rearwardly projecting bracket 116 which has a sleeve bearing 117 pivotably mounted on the outer race of the associated ball bearing unit 67; see Fig. 8, where a vertical sectional view illustrates in detail the mounting of the left-hand stripper unit upon its associated bearing unit 67. Inasmuch as the parts on the left-hand side of the drive for the power units are the same as on the right-hand side, the same reference characters are used on the two symmetrical structures illustrated in Fig. 8. These pivotal mountings of the sleeve bearings 117 facilitate vertical adjustment of the front end portion of the stripper units 21 and 22 about the axis of the transverse drive shaft 65. When the apparatus is in operation a chain 118, Fig. 5, connected between an anchorage 119 on the associated side sill of the tractor and an anchorage (not shown) on the inner side of the stripper unit 21 supports the front end of such unit a short distance above the ground line G. A similar chain is connected with the unit 22 on the other side of the tractor.

A rear end portion of the auger shaft 43 projecting rearwardly through the end wall 115 of the stripper unit 21 carries a bevel pinion 121 meshed with and driven by a pinion 122 which is constrained for rotation with the shaft 65. In this manner the auger shaft 43 is caused to rotate in the direction indicated by the arrow in Fig. 4 during forward movement of the vehicle.

An outer end portion of the shaft 65 projects through the right-hand frame member 66, Fig. 3, wherein it is journaled, and this outer end portion of the shaft 65 carries a sprocket 123 of which the hub 124 is constrained for rotation with the shaft. Sprocket 123 and chain 125 trained thereabout, Figs. 1, 3, and 6, are shielded from ground obstructions by a guard pan 126 carried by the auger trough end plate 115 and the outer wall of the stripper unit 21.

Figures 11, 12:
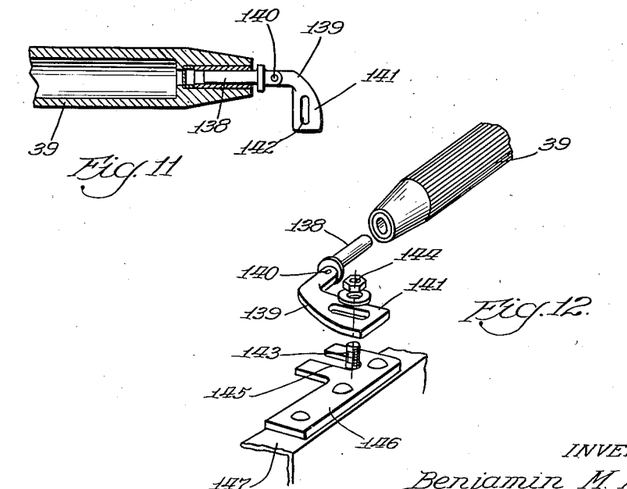
Figs. 11 and 12 are enlarged fragmentary views showing details of a bearing support for the front end of one of the stripper rollers.
Figure 14:
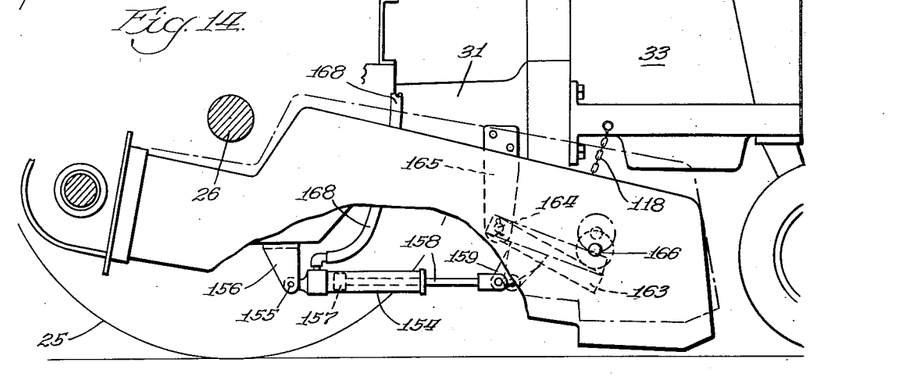
Fig. 14 is a side elevational view of the tractor and one of the stripper units of which a portion is broken away for exposing a hydraulic ram mounted beneath the tractor and connected with the units for supporting them at desired elevations or raising them to a transport position.
Figure 15:
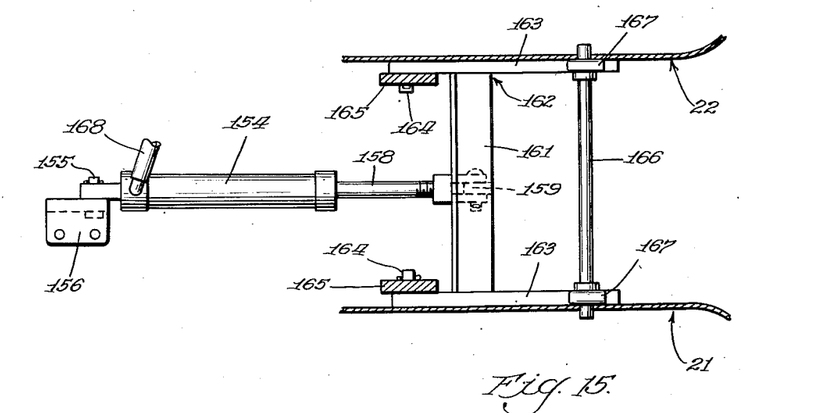
Fig. 15 is a plan view of the hydraulic ram and a pivotally mounted frame forming an operative connection between such ram and the stripper units.

Chain 125 has upper and lower flights projecting forwardly from the sprocket 123, the lower of these flights being trained beneath an idler sprocket 127, and the upper of these flights being trained beneath an idler sprocket 128, Fig. 1. These two sprockets 127 and 128 are journaled upon stub shafts 129 and 131, Fig. 5, suitably anchored in the casing of the stripper unit 21. An upwardly turned forward end portion of the chain 125 is trained over a sprocket 132 mounted on the outer end of a shaft 133 which is constrained for rotation therewith. This shaft is rotatably supported in the stripper unit casing as illustrated in Fig. 6, where it is also shown to carry a bevel pinion 134 meshed with a companion bevel pinion 135 upon the upper rear end of the fluted stripper roller 39. The upper end of the fluted stripping roller is rotatably supported in a bearing 136 which is secured to a transverse plate 137 having a hole (not shown) for receiving a section of the roller. The lower end of the roller 39 is journaled upon a spindle 138 pivotally carried at 140 by a bracket 139, Figs. 11 and 12, having a footing portion 141 containing a slot 142 for receiving an anchorage post 143 which is mounted on the stripping unit housing at one side of the plant receiving throat. When a nut 144 is loosened on the threaded bolt 143, the bracket 139 and the roller 39 thereon can be adjusted vertically. Note that the footing portion 141 of the bracket 139 is in a vertical plane as shown in Figs. 2 and 11 when installed on the stripper unit instead of in a horizontal plane as shown for convenience in Fig. 12. A notch 145 in a plate 146 secured to an element 147 of the stripper unit casing receives the bolt 143.

A similar bearing structure for the support of the lower end of the stripper roller 38 includes a bearing member corresponding to the bearing 138 and carried upon a bracket 139ª corresponding to the bracket 139. These two brackets 139 and 139ª, as illustrated in Fig. 6, are secured to portions of the stripper unit casing on opposite sides of the median line M (Fig. 6) extending lengthwise of the plant receiving throat. The rear upper end of the stripping roller 38 is journaled in a bearing 148 carried by the plate 137 and is driven by a gear 149 constrained for rotation with this roller and meshed with a gear 151 which is constrained for rotation with the roller 39.

Figure 10:
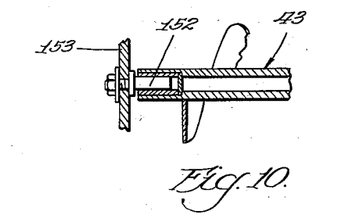
Fig. 10 is a detail showing the manner in which the front end of an auger shaft is rotatably supported.

In Fig. 10 a pilot bearing stud 152 for the front lower end of the auger 43 is illustrated. The front end wall 153 upon which the pilot bearing stud 152 is anchored is shown in Figs. 5 and 6.

The left-hand stripping unit 22 is constructed and driven similarly to the stripping unit 21. The auger of unit 22 is driven by gears 121 and 122 shown in the left-hand portion of Fig. 8 and identical with the gears 121 and 122 shown in the right-hand part of such figure. The left end of the shaft 65 as viewed from the rear carries a sprocket (not shown) corresponding to the sprocket 123, Figs. 1 and 6, for driving a chain corresponding to the chain 125 through which power is transmitted to the stripping rollers 38 and 39 of the unit 22.

Means for adjusting the height of the front ends of the stripping units 21 and 22 to any desired position above a lower limit determined by the chains 118, Figs. 1 and 5, and for raising the front ends of these units to a transport position comprises a hydraulic ram 154 disposed beneath the body of the tractor and having one end of its cylinder pivotally connected at 155 with a tractor-mounted bracket 156. The plunger 157 of this ram is connected by a rod 158 with a bracket 159 on a cross piece 161 of a pivoted frame 162 having side pieces 163 pivotally connected by pins 164 with brackets 165 depending from opposite sides of the tractor body. A rod 166 extending between the stripper units 21 and 22 carries rollers 167 which rest upon and are rollable along the side members 163. When fluid is introduced into the rear end of the ram 154 from a source of fluid (not shown) under pressure through a hose 168, the plunger 157 and rod 168 will be forced forwardly and cause the frame 162 to be pivoted upwardly, carrying with it the rollers 167 as they roll upon the members 163, thereby causing upward movement of the front ends of the stripper units 21 and 22. By controlling the amount of fluid in the ram the elevation of the stripper units may be selectively controlled.

The machine is placed in operation by moving the control lever 88 from the neutral position illustrated in Fig. 3 into the drive connecting position illustrated in Fig. 13. This permits the spring 81 to engage the jaw clutch 77—78. A wagon will be hitched on behind the tractor by coupling it to the drawbar member coupling 71. At this time the tractor will be stationed at the ends of two plant rows with which the throats 37, Fig. 2, of the stripper units 21 and 22 respectively register. Wheels 40 of the steering truck 41 will be between these two plant rows, and the traction wheels 24 and 25 will be on the outer sides of these two rows. When the vehicle is started forwardly, driving force for the stripping apparatus will be transmitted from the axle 27, Fig. 2, to the sprocket 72 constrained for rotation therewith. Power from the sprocket 72 is transmitted through the chain 73, Fig. 6, to the sprocket 74 and thence through the jaw clutch 77—78, to the cross shaft 75, thence through the rosette clutch 96—97 (Fig. 3), to the sprocket 95 (Figs. 1 and 3), chain 99 and sprocket 101 to the cross shaft 65. This shaft drives the elevator sprockets 102, whereby the elevator belt is revolved for transferring stripped cotton bolls from the elevator hopper 45, Fig. 6, upwardly in the elevator for discharge into the trail-behind wagon, as the vehicle moves forwardly.

Sprockets 123 on opposite ends of the cross shaft 65 drive the respectively associated chains 125 and the stripper unit shafts 133, whereby through the gears 134 and 135 the stripping rollers 39 are driven, and through the gears 151 and 149 (those of the right-hand unit, 21 being shown in Fig. 6) cause the stripping rollers 38 to be driven. Stripping rollers 38 and 39 and the auger shafts (driven through companion beveled gears 122 and 121) are caused to rotate in the direction shown in Fig. 4. Plant lifters 170 at the front of the units 21 and 22 lift the lower stems of the plants upwardly and guide the plant stalks into the space between the associated companion stripping rollers 38 and 39. These rollers 38 and 39 in each unit are spaced apart sufficiently to avoid gripping and pulling the plants from the ground, but are sufficiently close together to prevent passage of the bolls therebetween (Fig. 4) and thereby pinch off the bolls and cause them to be discharged sidewise into the auger trough 42 associated therewith. Arrangement of each stripping roller 38 above its companion stripping roller 39 facilitates discharge of the removed bolls transversely of the rollers in the direction of the associated auger trough. Those bolls discharged into the auger troughs are advanced rearwardly by the rotating augers 43 into registry with the passages 44 through which they are discharged by the paddles 46 into the elevator hopper 45, Fig. 6, from which they are elevated for discharge into the trail-behind wagon in the above-described manner.

Having thus described a single preferred embodiment of the invention with the view of clearly and concisely illustrating the same, I claim:

1. In a cotton stripping apparatus for use upon a tractor having a body projecting forwardly from a rear axle extending transversely of a rear portion of such body; said apparatus, when mounted upon the tractor comprising an elevator hopper, disposed rearwardly of said body and below said axle, a cotton stripper unit including stripper rollers disposed forwardly of said hopper alongside respective sides of the tractor body and projecting downwardly and forwardly from their rear ends, auger troughs disposed below said stripper rollers and solely between the tractor body and respective of said rollers, said troughs extending lengthwise and alongside of said rollers for receiving stripped cotton bolls therefrom, said troughs projecting rearwardly of the rear ends of said rollers at respective opposite sides of said hopper and where each trough has a side wall with an opening communicative with said hopper, augers in said troughs, said augers each having a radially extending paddle on a rear portion thereof in registry with the opening of its associated trough, and means for rotating said stripper rollers and said augers while rotating the augers in a direction to transfer the bolls rearwardly in the troughs into registration with their paddles and said paddles being operative to propel the bolls through said openings into the hopper.

2. In a cotton stripping machine, a pair of complemental stripping rollers projecting downwardly and forwardly from rear ends thereof, an auger trough disposed alongside of one of said rollers for receiving cotton bolls stripped from plants by said rollers, and journal means supporting said rollers for rotation about their respective axes and for supporting the other of said rollers at higher elevation than said one thereof to facilitate discharge of the stripped bolls into the trough.

3. In a cotton stripping machine, a cotton stripper unit comprising a casing, said casing having laterally spaced portions providing a plant receiving throat open at a forward end of said unit, a pair of complemental stripper rollers rotatably mounted in said casing at respective sides of a longitudinal median line of said throat, an auger trough in said casing extending lengthwise of said rollers beside one thereof and below the same for receiving stripped cotton bolls from said rollers, said trough being within one of the portions of said casing, and the other portion of said casing having a wall extending alongside the other of said rollers and projecting thereabove for deflecting stripped bolls across the rollers into said trough.

4. The combination set forth in claim 3, wherein the other of said rollers is supported at higher elevation than the one thereof to facilitate discharge of the stripped cotton bolls into said trough.

5. In a cotton stripping machine, a cotton stripper unit comprising a casing having forward and rear ends and divided at its forward end into laterally spaced portions defining a plant receiving throat, an auger trough in one of said casing portions, said auger trough extending horizontally in substantial parallelism with and upon one side of a longitudinal median line of said throat, said auger trough projecting rearwardly from the rear end of said casing, a pair of stripper rollers on respectively opposite sides of said median line and extending upwardly and rearwardly in said casing from a position adjacently to the forward end thereof, said stripper rollers being adapted to receive the plants of a row therebetween and to discharge the crop from said plants into the trough, an auger in said trough for propelling the crop rearwardly therein, and the other casing portion including a wall extending above said rollers and inclining upwardly toward the one casing portion to deflect the stripped cotton across the rollers into said trough.

BENJAMIN M. HYMAN.

REFERENCES CITED

The following references are of record in the file of this patent:

UNITED STATES PATENTS

| Number | Name | Date |
|---|---|---|
| 1,757,580 | Lower et al. | May 6, 1930 |
| 1,842,737 | Tharp | Jan. 2, 1932 |
| 1,959,070 | Thomann | May 15, 1934 |
| 2,001,079 | Court | May 14, 1935 |
| 2,214,818 | Johnston | Sept. 17, 1940 |